Sept. 14, 1926.

A. WHEATLEY

BABY CARRIAGE

Filed March 5, 1924

INVENTOR
Arthur Wheatley
BY Jas. H. Griffin
ATTORNEY

Patented Sept. 14, 1926.

1,599,505

UNITED STATES PATENT OFFICE.

ARTHUR WHEATLEY, OF NEW YORK, N. Y.

BABY CARRIAGE.

Application filed March 5, 1924. Serial No. 696,916.

This invention is a baby carriage and is directed more particularly to that type of baby carriage known to the trade as a stroller. The object of the invention is to provide such a vehicle which may be distended to form a conveyance for a child but which is adapted to be readily and conveniently compacted when not in use or when it is desired to take the vehicle on a car or railway train. Folding up carriages have heretofore been suggested but the structure of the carriage of the present invention differs from prior constructions and constitutes a marked improvement thereover.

An important feature of the present invention resides in the ease and expedition with which the vehicle may be distended from a compacted position and vice versa and this coupled with its extreme lightness in weight and relatively small size when in compacted condition commends it to persons who travel with a baby.

Speaking generally, the carriage of the present invention comprises a body to which are pivoted a tiltable back and a hinged footrest. Associated with the body are pivoted legs with which are associated wheels. By virtue of the pivotal mounting of the legs, the wheels are adapted to be swung from operable distended position into compacted condition. While the position of the legs is determined by means of toggle joints with the knuckles of which are associated an operating member. This operating member may be manually manipulated to simultaneously swing all of the wheels into or out of operative position and aside from this function the operating member serves the further purpose of supporting the seat of the vehicle in operative position. The advantage of this construction is that when the wheels are distended and a child seated in the vehicle, the weight of the child will be imposed upon the toggles so that any possibility of the collapsing of the carriage with consequent possible injury to the child is rendered impossible.

A suitable handle is provided for the propulsion of a vehicle and a novel feature of the invention resides in a unique connection between the handle and the tiltable back of the vehicle whereby the back may be adjustable through manipulation of the handle. The advantage of this construction is that its parts can be rapidly and easily brought into the desired position when distending the vehicle for use and conversely may be brought into proper position when compacting the vehicle without requiring independent and troublesome operations.

Features of the invention, other than those specified, will be apparent from the following detailed description and claims, when read in conjunction with the accompanying drawings.

The accompanying drawings illustrate one practical embodiment of the invention, but the construction therein shown is to be understood as illustrative, only, and not as defining the limits of the invention.

Figure 1:
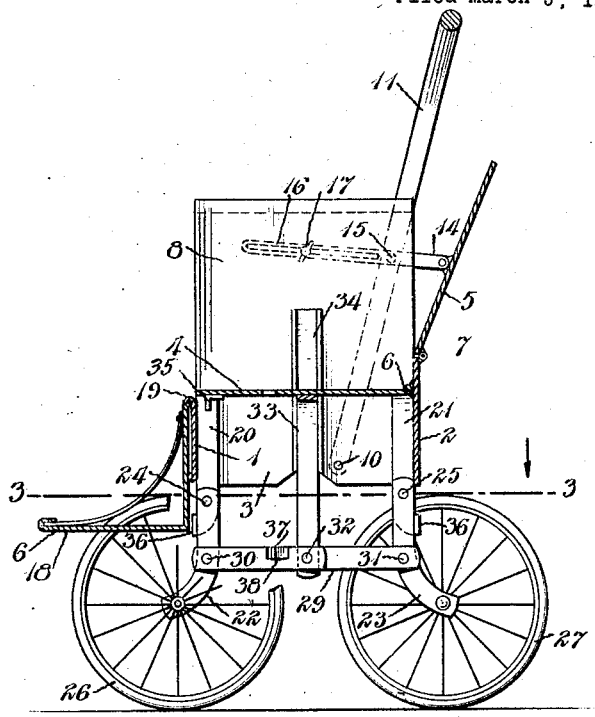
Figure 1 is a central section of a vehicle in distended position and embodying the present invention. This section being taken in the plane of the line 1—1 of Figure 3.

The vehicle shown in the drawings comprises a body having a front wall 1, a rear wall 2 and two side walls 3. To the rear wall 2 and near the upper edge thereof is pivoted a seat 4 and at the upper edge of the rear wall is pivotally secured a tiltable back 5. The hinge connection for the seat is designated 6 while the hinge connection for the back is designated 7. As shown in the drawings, the side walls 3 are extended above the seat to form the sides 8 of the carriage and along the upper edges of both of these sides and positioned on the exterior thereof are arm rests 9 secured to the sides in any suitable manner. The handle of the vehicle is pivoted to the side walls 3 on pivots 10 shown best in Figure 1 and extend upwardly from these pivots to constitute suitable means for propelling the vehicle. In practice, this handle which is generally designated by the reference character 11 may be constructed from a single piece of metal preferably of circular cross section and of substantially inverted U shape although, if desired, the side bars or vertical portions of the handle may be made separately from one another and joined together at their upper ends by a suitable handle bar.

Figure 2:
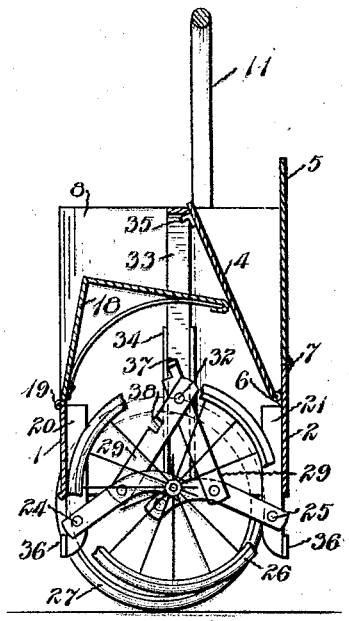
Figure 2 is a section similar to Figure 1 but showing the vehicle in compacted condition.
Figure 3:
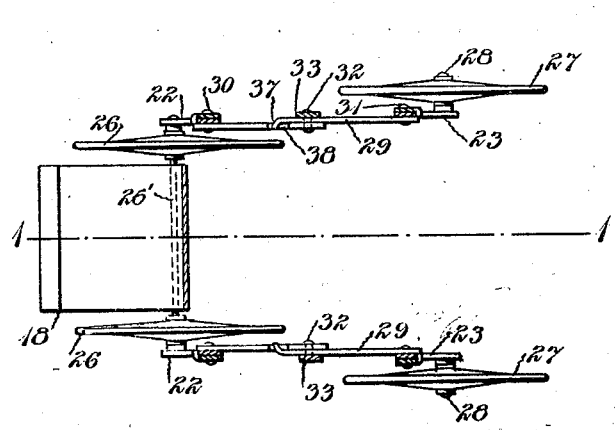
Figure 3 is a section on the line 3—3 of Figure 1.
Figure 4:
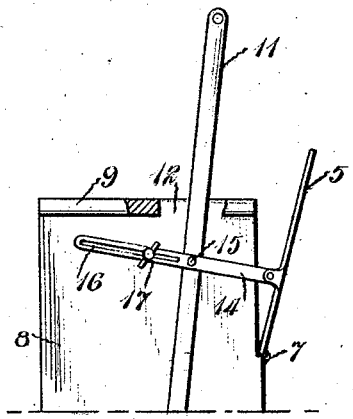
Figure 4 is a fragmentary elevation, partly in section showing the exterior of the upper portion of the vehicle.

The handle 11 is preferably so configurated as to extend upwardly in close proximity to the sides of the vehicle and the arm rests are preferably slotted as shown at 12 so that the handle may be adjusted from the substantially vertical position shown in Figure 2 to the inclined position shown in Figures 1 and 4.

Pivotally secured to the tiltable back adjacent each lateral edge thereof is a link 14 which extends in a forward direction and is secured to the side bars of the handle by means of pivots 15. These links are moreover extended forwardly beyond the side bars of the handle and are slotted as shown at 16. A bolt, anchored in each side 8 extends laterally through the slot 16 of the corresponding link 14 and with the outer end of the bolt is associated a wing nut 17. When these wing nuts are tightened, the links are locked in fixed position and shifting of the handle 11 and back 5 is prevented. However, when the wing nuts are loosened, the handle and tiltable back are adapted to be simultaneously shifted or regulated into the desired adjusted position. To preclude binding of the parts during this movement, the pivots 15 may work in short slots in the side bars 11, although, in practice, there is sufficient lost motion in the pivots and slots to compensate for the slight difference in movement between the handle and back. By this construction, it is possible for a rapid adjustment of the back through pivotal movement of the handle and this readily facilitates the preparation of the vehicle for occupancy by a child or the compacting of the vehicle for transportation.

Associated with the upper edge of the front wall 1 of the body is a footrest 18 pivoted to the front wall in any suitable manner as indicated at 19.

At each of the four corners of the body and anchored interiorly thereof by bolts, rivets or otherwise are four legs, the two front legs being designated 20 and the two rear legs being designated 21. These legs extend from directly beneath the seat downwardly to a point below the lower end of the body and to the extended portion of each leg is pivoted a bracket. The forward brackets are designated 22 while the rear brackets are designated 23. The forward brackets are pivoted to the legs 20 by means of pivots 24, while the rear brackets are pivoted to the legs 21 by means of pivots 25. With the lower ends of the front brackets are associated the front wheels 26 which may be supported individually on the brackets but as shown in the drawings are carried by an axle 26' the opposite ends of which are anchored in two forward brackets 22.

With the lower ends of the rear brackets 23 are associated the rear wheels 27 and in practice these wheels are positioned exteriorly of the brackets and are mounted on stub shafts 28, one of which is associated with each bracket 23.

The front and rear brackets 22 and 23 at the right hand side of the vehicle are connected by means of a toggle 29 and the right hand brackets of the vehicle are connected in a like manner. The ends of the toggle are secured to the front and rear brackets by pivots 30 and 31, respectively, and the knuckle pins 32 of the two toggles are pivotally associated with a toggle operating member 33. This toggle operating member is of substantially inverted U shape, the lower ends of the legs thereof being secured to the knuckle pins 32 as stated and the member being guided for vertical reciprocation in channel guides 34, one of which is mounted on the inner face of each side of the vehicle in fixed position. Channel guides are shown in the drawings although any suitable means may be employed other than the channel guides shown which will satisfactorily guide the member 33 for vertical reciprocation.

With this construction, it will be apparent that if the seat is swung upwardly into a substantially vertical position the toggle operating member 33 may be readily grasped and drawn upwardly from the position in which it is shown in Figure 1 into the position in which it is shown in Figure 2. By this operation, the toggles 29 at both sides of the vehicle will be simultaneously flexed to draw the brackets 22 and 23 toward one another and in so doing draw the front wheels into the lower portion of the body and the rear wheels into substantially axial alinement with the front wheels in a position exterior of the body, so that all of said wheels will be compacted together into a minimum space. The operating member 33 may be locked in its raised position by means of a detent 35 carried by the under side of the seat and near the forward edge thereof, the parts being so associated that after the operating member has been elevated, the seat may be swung forwardly to bring the detent 35 into engagement with the under side of the member 33 for the purpose of locking the member against inadvertently dropping down. The footrest may be moved into compacted position by merely tilting it upwardly and rearwardly into the space between the sides shown in Figure 2 while the back rest may be moved into compacted position by merely pushing the handle forwardly into a substantially vertical position. When the parts have thus been compacted the vehicle may be readily transported either by carrying it by the handle or by wheeling it along on the wheels which are in a position to properly function.

From the compacted position shown in

Figure 2, the vehicle may be conditioned to transport a child by reversing the operations stated but in this connection it will be noted that as the operating member is forced downwardly to move the wheels into distended positions, stops in the form of lugs 36 mounted at the lower end of the several legs and extending laterally into positions to be engaged by the brackets, will preclude overtravel of the brackets.

Moreover an inturned finger 37 formed on one link of each toggle will engage with a cut-out 38 formed in the corresponding link of each toggle so as to preclude overtravel of the links of the toggle. It is to be noted that after the wheels have been distended as described, the toggle operating member 33 will partake of a position wherein the seat, when tilted down into horizontal position, will rest directly upon the upper end of the toggle operating member so that when a child is resting upon the seat, the weight of the child will be imposed upon the toggle operating member and any tendency of this member to rise and inadvertently bring about compacting of the wheels is positively obviated.

It will be apparent from the foregoing description that the shifting of the parts from distended operative condition to compacted condition and vice versa may be accomplished easily and expeditiously and it will further be apparent from Figure 2 that when the parts are compacted they occupy a relatively small space and can be readily carried in crowds, in street cars or in other places. The device is preferably made quite light in construction so that it will not be burdensome and all of the constructional elements are so associated as to impart ease to the manipulation of these parts. The accompanying drawings show the invention in its preferred practical form, but inasmuch as slight details of construction may be varied without departing from the invention, the invention is to be understood as not limited to the precise details shown but as broadly novel as is commensurate with the appended claims.

Having thus fully described the invention, what I claim as new and desire to secure by Letters Patent is—

1. A baby carriage comprising a body, brackets pivotally associated therewith, wheels associated with the brackets, toggle mechanism for controlling the pivotal positions of the brackets, an operating member associated with the toggles and adapted to move the toggles into a position to shift the wheels into operative condition or to move the brackets into a position to compact the wheels with respect to the body, and a seat pivotally associated with the body and adapted when in a position to support a child to impose the weight of the child upon the toggle operating member for the purpose of maintaining the toggles in a position to hold the wheels in operative position.

2. A baby carriage comprising a body, brackets pivotally associated therewith, wheels associated with the brackets, toggle mechanism for controlling the pivotal positions of the brackets, an operating member associated with the toggles and adapted to move the toggles into a position to shift the wheels into operative condition or to move the brackets into a position to compact the wheels with respect to the body, and a seat pivotally associated with the body and adapted when in a position to support a child to impose the weight of the child upon the toggle operating member for the purpose of maintaining the toggles in a position to hold the wheels in operative position, a pivotally movable handle, a tiltable back associated with the body, and operative connections between the tiltable back and handle whereby pivotal movement of the handle will automatically effect pivotal adjustment of the back.

3. A baby carriage comprising a body, brackets pivotally associated therewith, wheels associated with the brackets, toggle mechanism for controlling the pivotal positions of the brackets, an operating member associated with the toggles and adapted to move the toggles into a position to shift the wheels into operative condition or to move the brackets into a position to compact the wheels with respect to the body, a seat pivotally associated with the body and adapted when in a position to support a child to impose the weight of the child upon the toggle operating member for the purpose of maintaining the toggles in a position to hold the wheels in operative position, a pivotally movable handle, a tiltable back associated with the body, operative connections between the tiltable back and handle whereby pivotal movement of the handle will automatically effect pivotal adjustment of the back, and a footrest pivoted to the body and adapted to be folded into compact position with reference to the body.

4. A baby carriage comprising a body, brackets pivotally associated therewith, wheels carried by the brackets, toggle mechanism connected with the brackets and adapted when flexed to move the brackets into positions to compact the wheels with reference to the body and to move said wheels into operative positions, a toggle operating member guided for substantially vertical movement and secured to the toggle mechanism, and a seat member adapted to impart the weight of a child imposed thereon to the toggle operating member, whereby the weight of the child is utilized to preclude inadvertent compacting of the wheels.

5. A baby carriage comprising a body, brackets pivotally associated therewith, wheels carried by the brackets, toggle mechanism connected with the brackets and adapted when flexed to move the brackets into positions to compact the wheels with reference to the body and to move said wheels into operative positions, a toggle operating member guided for substantially vertical movement and secured to the toggle mechanism, a seat member adapted to impart the weight of the child imposed thereon to the toggle operating member, whereby the weight of the child is utilized to preclude inadvertent compacting of the wheels, and means associated with the seat and adapted to cooperate with the toggle operating member, when the wheels are in compacted position, to preclude inadvertent distending of the wheels into operative positions.

In testimony whereof I have signed the foregoing specification.

ARTHUR WHEATLEY.